United States Patent
Tomey et al.

(10) Patent No.: US 7,169,421 B2
(45) Date of Patent: Jan. 30, 2007

(54) METHOD OF MAKING PROCESSED MEAT PRODUCTS

(75) Inventors: Jennifer L. Tomey, Sun Prairie, WI (US); Donald Edward Lucke, Rio, WI (US); Paul Gerard Morin, Madison, WI (US); Michelle L. Reeve, Glenview, IL (US); Daniel Brent Wilke, Waunakee, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 482 days.

(21) Appl. No.: 10/644,624

(22) Filed: Aug. 20, 2003

(65) Prior Publication Data

US 2005/0042361 A1 Feb. 24, 2005

(51) Int. Cl.
A23L 1/31 (2006.01)
G01N 33/12 (2006.01)

(52) U.S. Cl. .................... 426/231; 426/232; 426/233; 426/641

(58) Field of Classification Search ................ 426/231, 426/232, 233, 641
See application file for complete search history.

(56) References Cited

U.S. PATENT DOCUMENTS

| | | |
|---|---|---|
| 377,546 A | 2/1888 | Crane |
| 858,017 A | 6/1907 | Pence |
| 2,538,891 A | 1/1951 | Zimmerman et al. |
| 2,991,870 A | 7/1961 | Griffith et al. |
| 3,014,437 A | 12/1961 | Dutchess |
| 3,050,399 A | 8/1962 | Kielsmeier et al. |
| 3,216,375 A | 11/1965 | Ernst |
| 3,450,179 A | 6/1969 | Golding |
| 3,548,903 A | 12/1970 | Holly |
| 3,552,978 A | 1/1971 | Inklaar et al. |
| 3,599,687 A | 8/1971 | Tschantz |
| 3,612,130 A | 10/1971 | Ponka et al. |
| 3,647,190 A | 3/1972 | Iozzelli |
| 3,649,300 A | 3/1972 | Olson et al. |
| 3,690,623 A | 9/1972 | Boyne |
| 3,759,105 A | 9/1973 | Wallace et al. |
| 3,799,459 A | 3/1974 | Bakewell |
| 3,825,231 A | 7/1974 | McFarland |
| 3,879,150 A | 4/1975 | Brown et al. |
| 3,885,665 A | 5/1975 | Fisher |
| 3,901,483 A | 8/1975 | Lasar |
| 3,920,223 A | 11/1975 | Krueger |
| 3,924,836 A | 12/1975 | Bruning et al. |
| 3,942,768 A | 3/1976 | Hughes |
| 3,971,514 A | 7/1976 | Martinelli et al. |

(Continued)

FOREIGN PATENT DOCUMENTS

AU 9924991 4/1999

(Continued)

*Primary Examiner*—Arthur L. Corbin
(74) *Attorney, Agent, or Firm*—Fitch, Even, Tabin & Flannery

(57) ABSTRACT

A method and system for making processed meat products employing a feed-forward analysis wherein input streams are analyzed and their flow rates are controlled relative to each other. The system incorporates mixing devices in a housing through which the input streams are forced. The mixing devices provide high shear mixing and blending, and in some cases maceration and salt infusion for rapid protein extraction.

19 Claims, 3 Drawing Sheets

U.S. PATENT DOCUMENTS

| | | | |
|---|---|---|---|
| 3,992,985 A | 11/1976 | McFarland |
| 4,013,234 A | 3/1977 | Fay |
| 4,032,049 A | 6/1977 | Roberts |
| 4,036,477 A | 7/1977 | Sieradzki et al. |
| 4,168,431 A | 9/1979 | Henriksen |
| 4,171,164 A | 10/1979 | Groves et al. |
| 4,201,484 A | 5/1980 | Sasiela et al. |
| 4,226,540 A | 10/1980 | Barten et al. |
| 4,269,582 A | 5/1981 | Mella |
| 4,314,451 A | 2/1982 | Leeds et al. |
| 4,356,206 A | 10/1982 | Boldt |
| 4,382,404 A | 5/1983 | Hawley et al. |
| 4,409,704 A | 10/1983 | Seiffhart |
| 4,429,836 A | 2/1984 | Goransson |
| 4,443,109 A | 4/1984 | Watts |
| 4,473,299 A | 9/1984 | Guibert |
| 4,476,686 A | 10/1984 | Madsen et al. |
| 4,508,454 A | 4/1985 | Anders et al. |
| 4,518,262 A | 5/1985 | Bornemann et al. |
| 4,523,520 A | 6/1985 | Hofmann et al. |
| 4,539,210 A | 9/1985 | O'Connell et al. |
| 4,544,279 A | 10/1985 | Rudolph |
| 4,548,507 A | 10/1985 | Mathis et al. |
| 4,606,647 A | 8/1986 | Frye |
| 4,674,887 A | 6/1987 | Liicke et al. |
| 4,708,268 A | 11/1987 | Wurtz |
| 4,733,607 A | 3/1988 | Star et al. |
| 4,747,342 A | 5/1988 | Schack et al. |
| 4,813,860 A | 3/1989 | Jonsson et al. |
| 4,844,619 A | 7/1989 | Lesar et al. |
| 4,904,496 A | 2/1990 | Izzo et al. |
| 4,908,234 A | 3/1990 | Daussan et al. |
| 4,944,657 A | 7/1990 | Mowli |
| 4,987,850 A | 1/1991 | McCracken |
| 5,080,922 A | 1/1992 | Hosokawa |
| 5,083,506 A | 1/1992 | Horn et al. |
| 5,100,067 A | 3/1992 | Konig et al. |
| RE34,172 E | 2/1993 | Gwinn et al. |
| 5,240,324 A | 8/1993 | Phillips et al. |
| 5,286,514 A | 2/1994 | Webb et al. |
| 5,318,358 A | 6/1994 | Wobbe et al. |
| 5,324,108 A | 6/1994 | Baumgarten |
| 5,332,308 A | 7/1994 | Scheuring |
| 5,358,693 A | 10/1994 | Brinkmann et al. |
| 5,401,402 A | 3/1995 | Christy et al. |
| 5,407,268 A | 4/1995 | Henrich |
| 5,433,968 A | 7/1995 | Zarrage et al. |
| RE35,048 E | 10/1995 | Rudibaugh |
| 5,494,351 A | 2/1996 | Hakasalo |
| 5,505,542 A | 4/1996 | Braeker et al. |
| 5,527,107 A | 6/1996 | Weibel et al. |
| 5,657,687 A | 8/1997 | Callebaut et al. |
| 5,673,564 A | 10/1997 | Fradin |
| 5,707,145 A | 1/1998 | Liicke et al. |
| 5,775,986 A | 7/1998 | Law et al. |
| 5,800,055 A | 9/1998 | Sato |
| 5,820,041 A | 10/1998 | Moessmer et al. |
| 5,894,999 A | 4/1999 | Moessmer et al. |
| 5,913,602 A | 6/1999 | Steele |
| 5,953,984 A | 9/1999 | Moessmer et al. |
| 5,972,398 A | 10/1999 | Ludwig et al. |
| 5,981,269 A | 11/1999 | Park |
| 6,099,159 A | 8/2000 | Yoshida et al. |
| 6,287,188 B1 | 9/2001 | Righele et al. |
| 6,322,244 B1 | 11/2001 | Marchesini et al. |
| 6,550,959 B2 | 4/2003 | Huber et al. |
| 6,588,926 B2 | 7/2003 | Huber et al. |
| 6,588,928 B2 | 7/2003 | Huber et al. |
| 6,616,320 B2 | 9/2003 | Huber et al. |
| 6,648,501 B2 | 11/2003 | Huber et al. |
| 2002/0075754 A1 | 6/2002 | Huber et al. |
| 2002/0075755 A1 | 6/2002 | Huber et al. |
| 2002/0176318 A1 | 11/2002 | Huber et al. |
| 2002/0176319 A1 | 11/2002 | Huber et al. |
| 2002/0181321 A1 | 12/2002 | Huber et al. |
| 2002/0181324 A1 | 12/2002 | Huber et al. |
| 2003/0207006 A1 | 11/2003 | Jurgensen et al. |
| 2004/0136261 A1 | 7/2004 | Huber et al. |

FOREIGN PATENT DOCUMENTS

| | | |
|---|---|---|
| EP | 0325315 | 7/1989 |
| EP | 0380706 | 8/1990 |
| EP | 0700639 A1 | 3/1996 |
| EP | 0700725 A1 | 3/1996 |
| EP | 0674539 | 12/1997 |
| EP | 0870431 | 10/1998 |
| EP | 0962149 | 12/1999 |
| EP | 1100346 | 5/2001 |
| EP | 1269853 A1 | 1/2003 |
| EP | 1 402 782 A1 | 3/2004 |
| IE | 970904 | 3/1998 |
| JP | 63209549 | 8/1988 |
| JP | 63222656 | 9/1988 |
| JP | 1128764 | 5/1989 |
| JP | 3127966 | 5/1991 |
| JP | 4104774 | 4/1992 |
| JP | 4206030 | 7/1992 |
| RU | 2115319 | 7/1998 |
| RU | 2166854 | 5/2001 |
| RU | 2166858 | 5/2001 |
| RU | 2 204 917 | 5/2003 |
| SU | 1669522 | 8/1991 |
| WO | WO 79/00345 | 6/1979 |
| WO | WO 87/00733 | 2/1987 |
| WO | WO 90/01267 | 2/1990 |
| WO | WO 92/15393 | 9/1992 |
| WO | WO 93/08695 | 5/1993 |
| WO | WO 95/19710 | 1/1995 |
| WO | WO 98/05217 | 2/1998 |
| WO | WO 99/51135 | 10/1999 |
| WO | WO 01/33974 | 5/2001 |
| WO | WO 01/62096 A1 | 8/2001 |
| WO | WO 02/49748 A1 | 6/2002 |
| WO | WO 02/065860 A1 | 8/2002 |
| WO | WO 02/081922 A2 | 10/2002 |
| WO | WO 02/094025 A1 | 11/2002 |
| WO | WO 02/094513 A2 | 11/2002 |
| WO | WO 03/061400 A1 | 7/2003 |
| WO | WO 2003/092389 A1 | 11/2003 |
| WO | WO 2004/016097 A1 | 2/2004 |
| WO | WO 2004/082403 A1 | 9/2004 |

METHOD OF MAKING PROCESSED MEAT PRODUCTS

FIELD OF THE INVENTION

The invention relates to a meat processing system, and in particular to a meat processing system in which input streams are flow rate controlled and blended to yield a combined output stream.

BACKGROUND OF THE INVENTION

In commercial systems for making certain processed meat products such as bologna and hot dogs, chunks or pieces of raw meat and other ingredients such as spices are ground, chopped and/or otherwise blended with one or more salts or brine to provide a mixture that can subsequently be formed into a stable meat emulsion or matrix. Similar steps of grinding, chopping and/or otherwise working are also employed in making sausages, processed ham, processed turkey, and other processed meat products. In both cases, protein holds or bonds the separate pieces together.

Creation of protein bonds in this context requires a process commonly known as protein extraction. In this process, salt soluble, heat coagulable proteins such as myosin, actomyosin, and actin bind water, swell and become tacky as a result of working or blending of the meat in the presence of a salt or a salt solution. The proteins are subsequently set when heated to create a bond. Other myofibrillar proteins, as well as sarcoplasmic or water soluble proteins, may also play a role in bonding. Salts that may be used in protein extraction include, but are not limited to, sodium chloride, sodium pyrophosphate or diphosphate, potassium chloride, sodium lactate, and potassium lactate. In protein extraction as described herein, the mechanism believed to be primarily responsible for creation of the bonds involves binding proteins and water and subsequent swelling of the proteins, rather than solution of the proteins.

Batch processes for blending meat and other ingredients and extracting protein are well known. A known method for achieving protein extraction for certain products such as processed turkey and processed ham involves puncturing whole muscle meat with needles, injecting brine through the needles, and using a batch processor or mixer to work the meat for approximately 45 minutes under vacuum to remove air. For other products such as sausages, meat is ground and added to a batch processor with water, salt, spices, and/or other ingredients and worked with or without vacuum for 15 to 45 minutes. A large batch mixer may process approximately 6,000–12,000 pounds per hour. While such mixers have been used commercially for many years, they have significant drawbacks with respect to their space requirements and cost due to their large size, as well as the length of time required for processing each batch, and the time and expense associated with cleaning of the apparatus.

SUMMARY

The invention relates to an improved method and apparatus for use in making processed meat products that provides significant advantages with respect to the size of the apparatus, the time required for processing, the control of the process and/or other aspects of the manufacturing process.

In one embodiment, the method comprises feeding a plurality of input food ingredient streams comprising one or more meat ingredient streams, measuring at least one component of at least one meat ingredient stream, and controlling relative flow rates of the input food ingredient streams based on the measurements using a feed forward analysis to maintain a percentage of at least one component in the combined stream within a predetermined range. Where two meat ingredient streams are employed, they may be differentiated by fat content, with one having a significantly higher fat content than the other. In addition to one or more meat ingredient streams, other input streams may comprise water, salts, spices, preservatives, and other ingredients, separately or in combination.

The control system preferably includes at least one in-line analyzer for measuring a compositional characteristic of at least one meat input stream and regulating one or more input flow rates in response to output data from the analyzer(s). The system may directly measure a compositional characteristic such as fat content, or may measure a related characteristic such as moisture content from which fat content may be estimated. The control system may include a plurality of analyzers in-line for analyzing compositional characteristics of a plurality of non-homogeneous input streams. The control system preferably operates one or more pumps or valves for each food input stream. Flow may be regulated by varying pump speed, by intermittent pump operation, by opening and closing one or more valves, by varying flow rate with one or more metering valves, or by other means. The control system thus may control both the combined flow rate and the relative flow rates of the input streams. The relative flow rates may be adjusted by the control system based on analysis of the compositional characteristics by the analyzer.

Feed forward composition analysis may enable rapid adjustment of the flow rates of the input streams to enable control of fat content, protein content, moisture content, and/or other variables of the combined stream without the need to rely on a feedback loop based on measurements of components in the combined stream. By introducing the controlled components in desired proportions at the input end, the feed forward control system may also improve processing time by eliminating delays associated with adding and mixing additional ingredients to correct deviations from desired content levels. The feed forward control system thus may enable a mixture or blend having a desired composition to be produced from ingredients introduced at the input end and flowing through the processor in a single pass, without recycling any of the output of the processor.

The preferred apparatus comprises a housing within which the input streams are processed, and at least one rotatable mixing device located within the housing. Each mixing device may comprise a plurality of elements such as paddles, blades or screws or may consist of a single element such as a single screw, blade or paddle. The mixing devices may be removably supported on one or more shafts, but to facilitate thorough cleaning without disassembly are preferably integral therewith. In some embodiments, the mixing devices and shaft may be welded together or formed as a one-piece, unitary machined part.

Rapid protein extraction and/or maceration may be achieved through the use of a continuous high shear mixer for a short period of time. One mixer in accordance with an embodiment of the invention comprises a plurality of rotating paddles that force some or all of the mixture through one or more gaps of about 0.08" between the paddles and the interior of the mixer housing, and between various pairs of paddles, as the mixture advances through the apparatus. The system preferably achieves sufficient protein extraction, blending, and in some cases maceration in less than 5 minutes of processing time, and is believed to be capable of achieving sufficient protein extraction, blending and maceration in less than one minute. In one particular embodiment, the processing time is about 45 seconds. That is, the average time required for a given element of the mixture to pass through the processor is about 45 seconds. Within that time, the mixer is capable of forming ingredients comprising chunks or pieces of raw meat, along with salts, water, spices, etc., into a mixture that, when cooked, will form a cohesive, self supporting processed meat product without further protein extraction or maceration. It should be noted that for some products, e.g., bologna and hot dogs, further processing steps may take place that may incidentally involve additional protein extraction.

In some embodiments, mixing may take place at atmospheric pressure. In other embodiments, the mixing operation may take place in a vacuum environment of, e.g., 25–29 in. Hg vacuum.

DETAILED DESCRIPTION OF PREFERRED EMBODIMENTS

Figure 1:
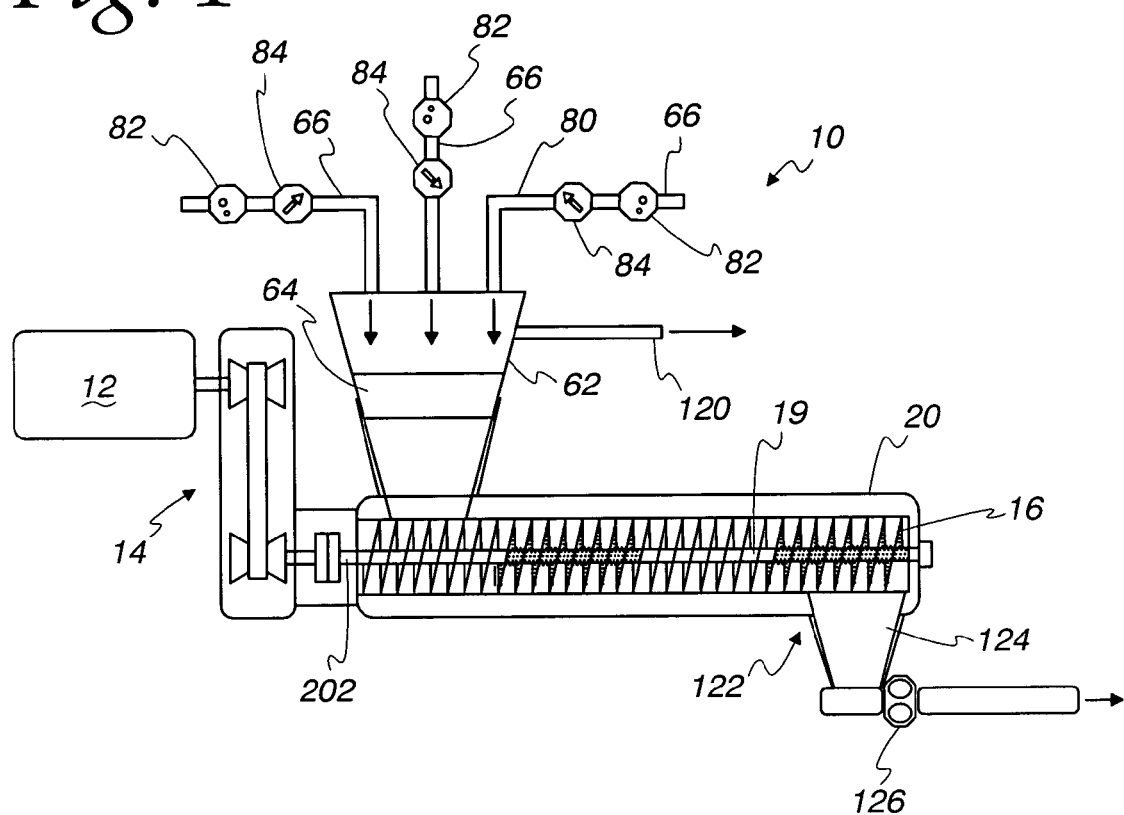
FIG. 1 is a schematic representation of a continuous mixing processor in accordance with an embodiment of the invention.
Figure 5:
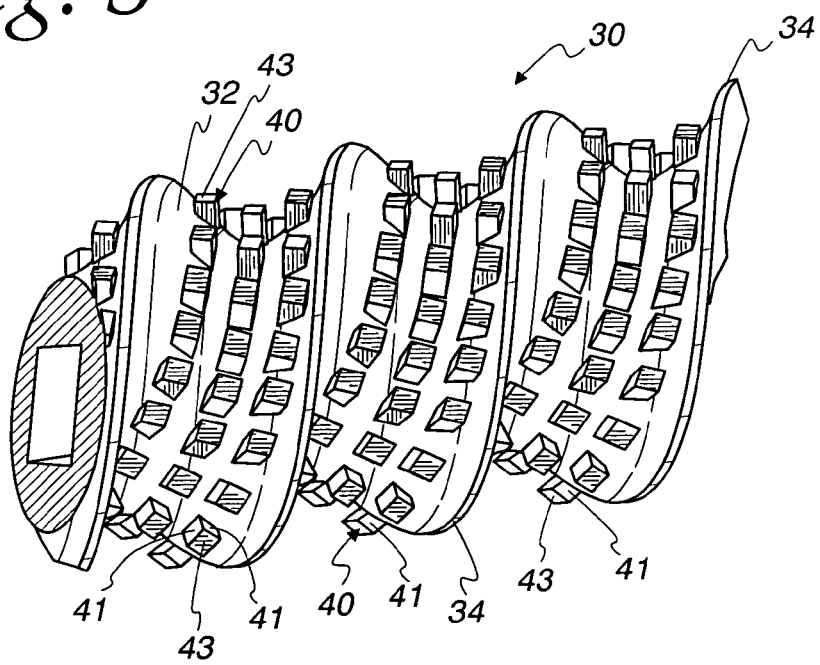
FIG. 5 is a fragmentary side view of a segment of a rotational element in accordance with an embodiment of the invention.

The invention is preferably embodied in a method and apparatus for making processed meat products. An apparatus in accordance with an embodiment of the invention is shown diagramatically at 10 in FIG. 1. The illustrated apparatus comprises a motor 12 and a belt drive 14 transmitting power to one or more mixing devices 16 located in a housing 20. Ingredients such as chunks or pieces of meat, one or more salts, water, flavorings such as spices, and preservatives are input through a hopper 62. The mixing devices advance the mixture through the housing and apply a high shear rate to the mixture to achieve rapid protein extraction from the meat components. The mixing devices are preferably made of stainless steel or another material that is wear resistant and suitable for contact with food product components.

Figure 2:
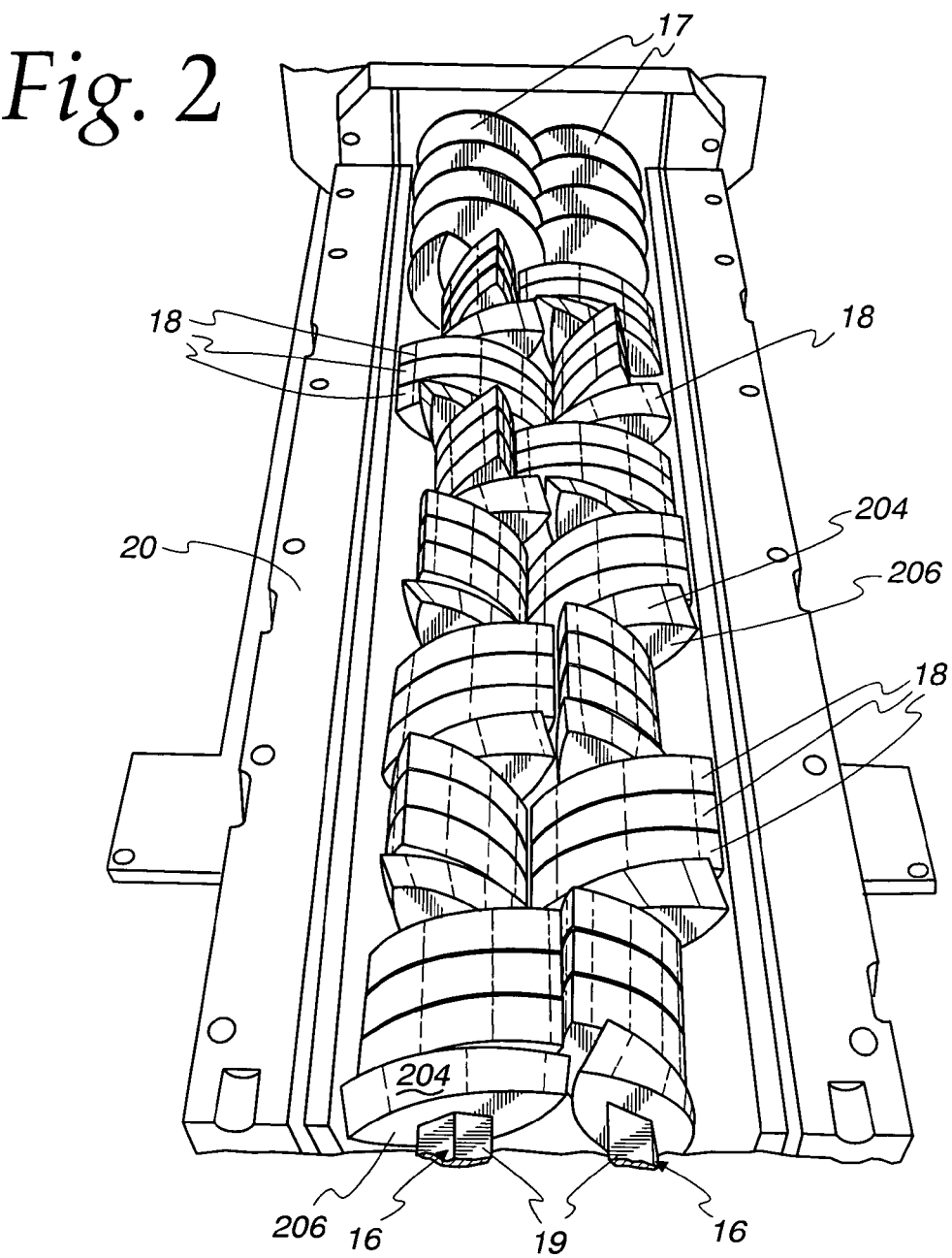
FIG. 2 is a perspective view of a mixing apparatus used in an embodiment of the invention, shown with a portion of the housing removed.

While a single elongated screw as shown in FIG. 1 may be employed as a mixing device in some embodiments, other embodiments employ other types of mixing devices. The embodiment illustrated in FIG. 2 employs a twin shaft arrangement with a relatively short infeed screw 17 used in combination with a longer array of paddles 18 on each shaft 19. As the ingredients are forced through the housing 20, the rotating paddles 18 macerate and/or mix the ingredients, and subject the ingredients to high shear by forcing them through narrow gaps between the paddles 18, and between the paddles 18 and interior walls of the housing 20. The minimum gaps or clearances between the paddles 18 of one shaft 19 and the paddles of a second mixing device 16, as well as between the paddles 18 and the housing 20, are preferably between 0.06 in. and 0.12 in. In some embodiments, the gaps are 0.08 in. Forcing the mixture through these gaps provides high shear and results in rapid protein extraction. This apparatus is believed to be capable of working meat ingredients and extracting protein therefrom much faster than prior art batch processes, and specifically is believed to be capable of reducing processing time from about 45 minutes to approximately forty-five seconds with or without the need for a vacuum environment. One example of a commercially available mixer such as that described is a Twin Shaft Continuous Processor manufactured by Readco Manufacturing, Inc., of York, Pa., having 5" diameter paddles 18 on counterrotating shafts 19, and throughput of about 6,000 lbs./hr. at about 200 rpm. In operation, the shafts may have adjustable speeds. Satisfactory operation of the system may be achieved with rotational velocities of, e.g., 100–250 RPM. In other embodiments, larger or smaller mixers may be used, e.g., 8 in. diameter mixers having throughput of up to about 25,000 lbs./hr.

Figure 3:
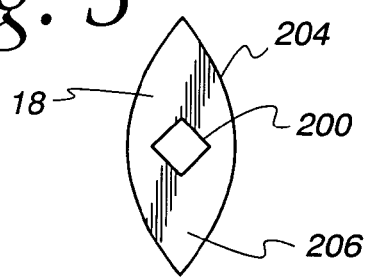
FIG. 3 is a front elevation view of a component of the apparatus of FIG. 2.
Figure 4:
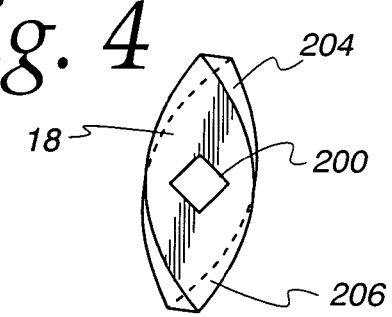
FIG. 4 is a front elevation view of another component of the apparatus of FIG. 2.

As shown in FIGS. 3 and 4, each of the illustrated paddles 18 has a bore 200 through which a shaft may pass. To couple each paddle to the shaft for rotation therewith, each paddle has a noncircular bore therethrough and the shaft has a cross section of the same shape. In the illustrated embodiment, each paddle has a square bore, and the shaft accordingly has a square cross section. This permits the paddles to be placed in different rotational orientations and different orders, i.e., configurations to vary shear rate, throughput rate, and/or other process parameters. The paddles may also be interchanged with paddles of different configurations. In other embodiments, to facilitate cleaning and sterilization of the apparatus, the paddles may be formed integrally with the shaft as a one-piece, unitary rotor, or may be otherwise supported for rotation therewith.

In the illustrated embodiment, each paddle 18 has a generally ovate profile shaped similar to that of an American football, with a point or very small radius of curvature at each end (FIG. 3). The illustrated paddles have flat, parallel faces 206 and arcuate peripheral edge surfaces 204. As illustrated in FIG. 3, for some of the paddles, the edge surface 204 is perpendicular to the faces. In others of the paddles, illustrated in FIG. 4, the edge surface 204 is angled relative to the faces, and the faces are angularly offset slightly relative to each other, so that rotation of the paddle assists the screws 17 in pumping the mixture forward through the housing.

On each shaft 19, each of the paddles 18 has a wiping action relative to one or more paddles on the opposite shaft to avoid build up of ingredients on the paddles. This self-cleaning characteristic helps to maintain flow of the ingredients through the mixer, and helps in maintaining good distribution of the ingredients. Shaft 19 is preferably a one piece unitary item that may be removed from the housing 20.

A modified screw element 30 that may be used in conjunction with or instead of one or both of the screw elements 17 and paddles 18 described above is shown in FIG. 2. The screw element 30 has a helical outer edge 34 disposed at a predetermined radius from the axis of the screw, and spaced from the interior of the housing by a narrow gap of, e.g., about 0.08 in. On the face 32 of the screw are provided a plurality of sharp-edged protrusions or blocks 40 for puncturing whole muscle meat components of the mixture to facilitate protein extraction. Each of the illustrated protrusions 40 has five exposed faces. Each of the illustrated protrusions comprises two pair of generally parallel quadrilateral side faces 41 and a quadrilateral end face 43. The end faces are rectangular, and in particular, square, and are perpendicular to the side faces. The end faces and side faces are substantially planar.

As shown in FIG. 1, ingredients are channeled into the mixer through an inlet hopper 62. A pre-blending device 64 may be provided prior to or within the hopper to provide an initial mixing or blending action, and/or to assist in pumping the input streams downward through the hopper.

Ingredients are supplied as input streams by a plurality of input assemblies 66. The input streams may include a first stream comprising predominantly lean meat or muscle content, a second stream comprising predominantly fat content, a third stream comprising one or more salts such as sodium chloride dissolved in water, a fourth stream comprising an aqueous nitrite solution, and a fifth stream consisting essentially of water. Additional ingredients including flavorings such as spices, preservatives, and/or other ingredients may be introduced in additional streams, or may be incorporated in one of the five streams described above.

In the embodiment of FIG. 1, each of the input assemblies 66 includes a feed line 80 for carrying an ingredient to the inlet hopper 62, a content analyzer 82 on the feed line, and a metering pump 84 or valve downstream from the analyzer on the feed line. In other embodiments, e.g., the embodiment of FIG. 6, content analyzers are employed on some but not all of the input assemblies.

As an ingredient stream passes through an associated content analyzer 82, the stream is analyzed to determine, for example, fat, moisture and/or protein content. In order to achieve balance between the various ingredients in the desired ratio, a control system receives input from a plurality of analyzers, and regulates the throughput rates of the metering pumps 84 so that the ingredients flow into the inlet hopper 62 in the desired ratio.

Various methods may be used for analyzing the fat moisture or protein content. Known methods include use of microwave energy or infrared light. Commercially available in-line analyzers may be programmed to analyze characteristics of a wide variety of substances ranging from, e.g., petrochemicals to processed cheese. Examples of such analyzers include in-line analyzers GMS#44 and GMS#46 manufactured by Weiler and Company, Inc., of Whitewater, Wis., and the Process Quantifier manufactured by ESE Inc. of Marshfield, Wis. These analyzers typically must be calibrated for each individual application, either by the manufacturer or by the end user.

Figure 6:
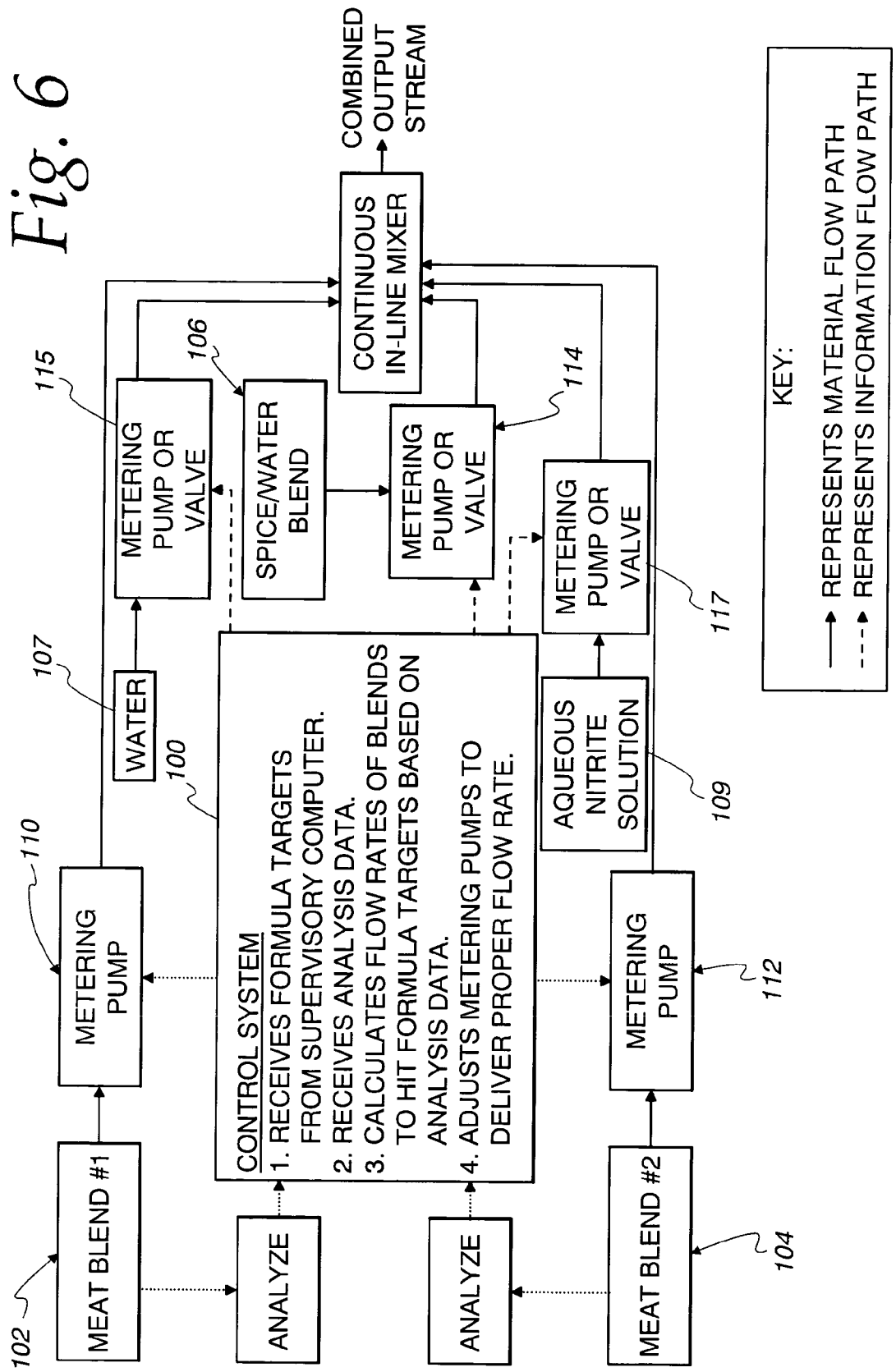
FIG. 6 is a flow diagram representing a process in accordance with an embodiment of the invention.

FIG. 6 illustrates a process embodying the invention comprising a control system 100 balancing flow rates of a plurality of input streams to maintain compositional parameters within desired ranges using a feed forward analysis. In the process of FIG. 6, there are two meat input streams 102 and 104. In other embodiments, the process may employ only one meat input stream, or three or more meat input streams.

The process preferably employs one or more additional input streams to supply moisture, flavor enhancers, preservatives, and/or other ingredients. In the process of FIG. 6, there are three non-meat input streams comprising a spice/water blend input stream 106, a water input stream 107, and an aqueous nitrite solution input stream 109. Other embodiments may employ more or fewer non-meat input streams.

To produce a mixture with desired moisture, protein and fat content levels, the control system 100 regulates the flow rates of the input streams by adjusting the speed of a pump or valve associated with each input stream. In the embodiment of FIG. 6, metering pumps 110 and 112 regulate flow rates of the meat blend input streams, and additional pumps or valves 114, 115 and 117 are employed to regulate the flow rates of the other input streams.

Adjustments are made using a feed-forward method whereby the pumps and valves provide the proper relative amounts of the input streams based on upstream analysis. To determine the need for adjustments to the various flow rates, the control system 100 utilizes the content analyzers 82 to determine the protein, fat and/or moisture content levels of ingredient input streams 102, 104 upstream of the metering pumps 110 and 112. In some embodiments, for each input stream element that is analyzed, analysis is completed before the element reaches the metering pump associated with the input stream so that the flow rate of the associated input stream may be adjusted as needed to maintain the desired compositional parameters of the combined output stream continuously within the target range. In other embodiments, analysis may take place after the element has passed through the metering pump, and flow rates may be adjusted as necessary to account for the delay. Thus, the percentages of protein, moisture and fat entering the mixer are preferably regulated so that adjustments to variations in input stream characteristics are made as the input streams flow into the hopper, rather than being made in response to characteristics of the mixture measured downstream from the mixer 10.

The mixer 10 preferably includes an output port 122 for discharging the mixture, and may include an outlet hopper 124 to receive the mixture and channel it to a delivery pump 126. To maintain the process at subatmospheric pressure, one or more vacuum lines may be in communication with the apparatus in one or more points. FIG. 1 illustrates a vacuum line 120 in communication with the inlet hopper 62. In other embodiments, vacuum lines may be connected to other locations in addition to or instead of the inlet hopper. For example, vacuum lines may be connected to the outlet hopper, to points between the inlet and outlet hoppers, and to points downstream from the outlet hopper.

As the protein extraction is a function of time and shear force in the presence of a salt solution, the power drive 12 is a variable speed motor so that the constituents are contained within the housing 20 for mixing for a time necessary to allow both salt solution infusion and shearing action.

After being processed by the mixer 10, the mixture may be subjected to further processing steps, e.g., a diffusive chemical process such as curing. Curing may be effected using, e.g., sodium nitrite and/or sodium chloride. In processes for making products such as bologna and hot dogs, the mixture may be subjected to a further step of particle size reduction to produce an emulsion from the mixture In connection with sensing fat, moisture and protein content of meat components, it has been found that moisture content may correlate to fat and protein content. It is believed that the correlation may be sufficient to enable moisture content of meat components from a known source to be used as a predictor of fat and/or protein content with sufficient accuracy that fat and/or protein content may effectively be measured simply by measuring moisture content. Accordingly, in certain embodiments of the invention, the step of measuring fat and/or protein content may consist of measuring moisture content after having calibrated the moisture meter appropriately. The control system can then control fat and/or protein input based on the moisture content readings of one or more input streams.

From the foregoing, it should be appreciated that the invention provides a new and improved method for effecting protein extraction and mixing of meat components for certain processed meat products. The term "meat" is used broadly herein to refer to meat such as beef, pork, poultry, fish and meat byproducts, including cuts or pieces that are all or primarily all fat, as well as lean cuts or pieces that have relatively higher protein content. The terms "meat product" and "meat ingredient" are used broadly herein to refer to products or ingredients that contain meat, alone or in combination with other components.

The preferred embodiments described above relate to continuous processes, i.e., processes in which ingredients are input during discharge of a combined output. In these processes, the input and/or the output steps may be interrupted periodically or may be intermittent.

The preferred embodiments of the invention are believed to be effective for achieving rapid protein extraction and mixing of food components in a much smaller apparatus than that used in certain prior art batch mixing processes. In addition to reducing floor space requirements, the preferred embodiments of the invention also may reduce cost and cleanup time as compared with these prior art processes and apparatus. The invention may also result in significant cost savings by enabling more precise control of the composition of the combined output stream.

While specific embodiments have been described above, the invention is not limited to these embodiments. The invention is further described in the following claims.

The invention claimed is:

1. A method of making processed meat products comprising:
    feeding a plurality of input meat ingredient streams, having different compositional characteristics, into a mixing device;
    measuring at least one compositional characteristic of at least one of said meat ingredient streams;
    controlling relative flow rates of the input meat ingredient streams based on the at least one compositional characteristic measurement using a feed forward composition analysis to maintain said at least one compositional characteristic within a predetermined range;
    directing the input meat ingredient streams into a processor;
    processing together the input meat ingredient streams; and
    producing a combined meat stream from the processed input meat ingredient streams having said at least one compositional characteristic within said predetermined range.

2. A method in accordance with claim 1 wherein the method is continuous, the duration of said processing is less than 5 minutes, and sufficient protein extraction is achieved such that subsequent cooking of said combined food stream will result in a cohesive, self supporting processed meat product.

3. A method in accordance with claim 1 wherein the method is continuous, the duration of said processing is less than one minute, and sufficient protein extraction is achieved such that subsequent cooking of said combined food stream will result in a cohesive, self supporting processed meat product.

4. The method of claim 1 wherein at least one of the input meat ingredient streams is predominantly lean meat.

5. The method of claim 1 wherein at least one of the input meat ingredient streams is predominantly fat.

6. The method of claim 1 wherein at least one of the input meat ingredient streams contains a salt solution.

7. The method of claim 1 wherein at least one of the input meat ingredient streams contains an aqueous nitrite solution.

8. The method of claim 1 wherein processing includes infusing a salt solution into an input meat ingredient stream containing muscle tissue.

9. The method of claim 1 wherein processing includes macerating an input meat ingredient stream containing muscle tissue.

10. The method of claim 1 wherein processing includes protein extraction from an input meat ingredient stream containing muscle tissue.

11. A method of making a processed meat product having a first compositional characteristic within a predetermined final range comprising:
    supplying a first meat ingredient of the processed meat product at a first flow rate;
    supplying a second meat ingredient of the processed meat product at a second flow rate;
    combining said first and second ingredients into a mixture;
    measuring a second compositional characteristic of said first ingredient upstream of said combining;
    maintaining the first compositional characteristic of the mixture within a predetermined intermediate range by varying one of said first and second flow rates in response to said measuring based on a correlation between said first and second compositional characteristics;
    processing the mixture to produce the processed meat product with the first compositional characteristic within the predetermined final range.

12. The method of claim 11 wherein said processing includes includes cooking.

13. The method of claim 11 wherein said processing includes blending.

14. The method of claim 11 further comprising supplying a third ingredient of the processed meat product at a third flow rate, wherein said combining said first and second ingredients into a mixture further comprises combining said third ingredient into the mixture.

15. The method of claim 11 wherein said first compositional characteristic comprises fat content.

16. The method of claim 15 wherein said second compositional characteristic comprises moisture content.

17. The method of claim 11 wherein said first compositional characteristic comprises protein content.

18. The method of claim 17 wherein said second compositional characteristic comprises moisture content.

19. The method of claim 11 wherein said first compositional characteristic comprises total fat and moisture content and the second compositional characteristic comprises moisture content.

* * * * *